United States Patent [19]

Kotaki et al.

[11] Patent Number: 4,901,050
[45] Date of Patent: Feb. 13, 1990

[54] TILT SENSOR FOR VEHICLE STEERING SHAFT

[75] Inventors: Mitsuko Kotaki, Chiryu; Takayoshi Tsuzuki, Toyota; Yukihisa Oda, Chiryu; Ryohei Yabuno; Masami Ishii, both of Toyota, all of Japan

[73] Assignee: Aisin Seiki Kabushiki Kaisha, Kariya, Japan

[21] Appl. No.: 225,202

[22] Filed: Jul. 28, 1988

[30] Foreign Application Priority Data

Jul. 29, 1987 [JP] Japan .................................. 62-189780

[51] Int. Cl.⁴ ........................ H01C 7/00; B63H 21/26
[52] U.S. Cl. ............................................ 338/13; 440/1
[58] Field of Search ..................... 440/1, 2, 6; 338/13; 324/65 R

[56] References Cited

U.S. PATENT DOCUMENTS

| | | | |
|---|---|---|---|
| 3,578,409 | 5/1971 | Silverman et al. | 338/13 X |
| 4,500,865 | 2/1985 | Tanaka et al. | 338/13 |
| 4,734,065 | 3/1988 | Nakahama et al. | 440/1 |

Primary Examiner—Donald A. Griffin
Attorney, Agent, or Firm—Burns, Doane, Swecker & Mathis

[57] ABSTRACT

A tilt sensor for a vehicle steering shaft includes a base resistive element layer formed in an opposed contact with a base plate surface. A plural layer structure is provided with a protective resistive element layer constructed by at least one layer formed on the base resistive element layer and an uppermost layer of the volume inherent resistance of the protective resistive element layer is higher than the volume inherent resistance of the base resistive element layer. The volume inherent resistance of the protective resistive element layer is from 2 to 500 times the volume inherent resistance of the base resistive element layer.

3 Claims, 2 Drawing Sheets

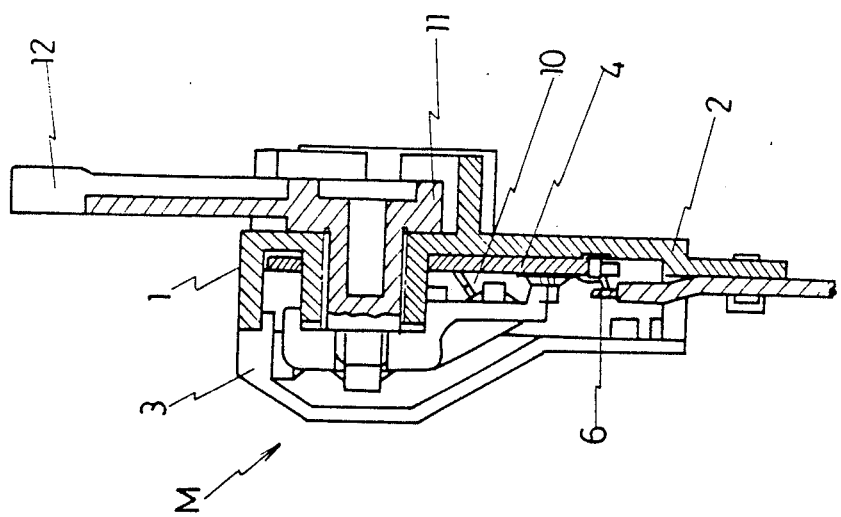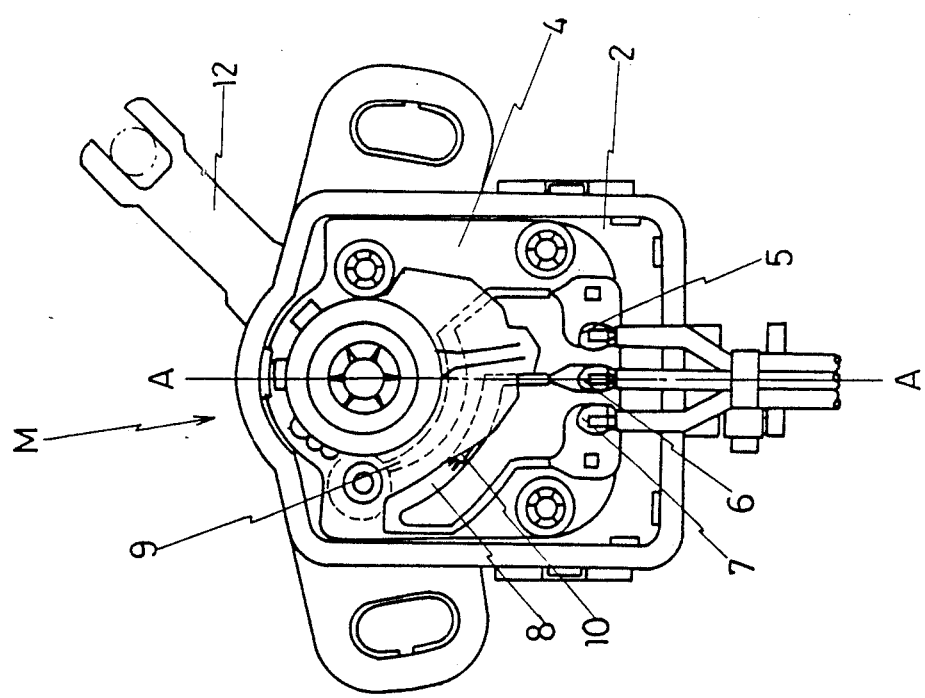
Fig 1
Fig 2

TILT SENSOR FOR VEHICLE STEERING SHAFT

BACKGROUND OF THE INVENTION

1. Field of the Invention

The present invention relates to a sliding resistive element layer and particularly to a tilt sensor for a vehicle steering shaft for controlling the angle of a steering shaft for a vehicle.

2. Description of Prior Art

A prior art technique for controlling the angle of a steering shaft for a vehicle is shown in FIG. 4. A switching end piece on a rotational shaft, rotated according to the angle of a handle, is provided on a tilt sensor 31 which determines the angle of a steering shaft 30. A switching end piece is contacted with a fixed contact formed on a base plate and a sensor for outputting the angle of the handle in digital form. However, the digital tilt sensor only detects ON-OFF conditions. Accordingly, it will not be fatal if, for example, dust enters into the case of the sensor device and the fixed contact is interrupted. Therefore, the structure of the case is relatively simple and is utilized for a tilt sensor in which size of the device is small and attaching positions of the device are limited, however, there is a problem in that detection of continuous volume change can not be performed.

On the other hand, continuous detection can be performed in an analog type sensor device in which a sliding member is provided on a resistive element and a current collector in order to obtain an output. Accordingly, precautions must be taken to prevent the resistive element being interrupted by dust invading from the outside and/or deformed by the outside heat. The case of such an analog sensor is required to be of airtight construction which creates a problem in that the whole sensor is of a large size. As a result, although the analog type is desirable as a tilt sensor of a vehicle steering shaft, it has not been used.

SUMMARY OF THE INVENTION

Accordingly, it is an object of the present invention to provide a tilt sensor for a vehicle steering shaft which is of small size and is lightweight.

The above object and others are achieved by a tilt sensor for a vehicle steering shaft including a base resistive element layer having an opposed contact with a base plate surface. A plural layer structure is provided with a protecting resistive element layer constructed by at least one layer formed on the base resistive element layer and a uppermost layer of the volume inherent resistance of the protective resistive element layer is greater than the volume inherent resistance of the base resistive element layer. The volume inherent resistance of the protective resistive element layer is from 2 to 500 times the volume inherent resistance of the base resistive element layer.

BRIEF DESCRIPTION OF THE DRAWINGS

FIG. 1 is a plan view of a tilt sensor according to the present invention;

FIG. 2 is a sectional view taken along 2—2 line in FIG. 1;

DETAILED DESCRIPTION OF THE PREFERRED EMBODIMENTS

Figure 4:
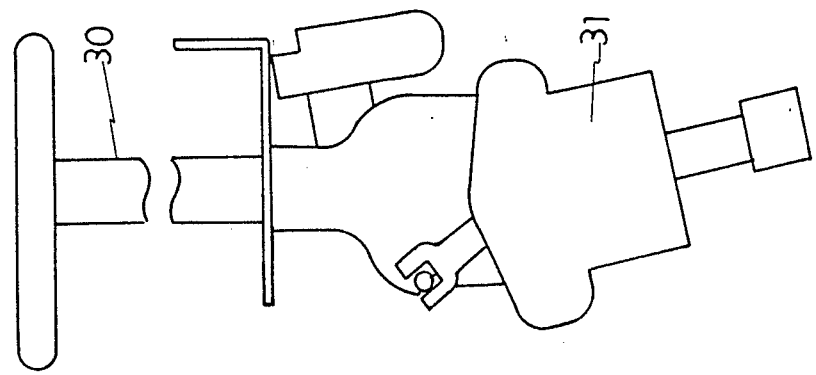
FIG. 4 is an explanatory view upon attachment of the tilt sensor on a handle.

Referring to the FIGS. 1 and 2, M indicates a tilt sensor and reference numeral 1 is a holding case which comprises a bottom plate 2 and a cover 3 for covering the bottom plate 2. A main body of the tilt sensor M is contained in the case 1.

A base plate 4 is fixedly connected on the bottom plate 2. A resistive element 8 and a current collector 9 are formed on the base plate 4 in a substantially circular arc shape. A sliding member 10 is provided so as to contact with the resistive element 8 and the current collector 9.

The sliding member 10 is in engagement with an actuating shaft 12 connected to a steering shaft via an engaging shaft 11 and slides along the surface of the resistive element 8 and the current collector 9 in accordance with the degree of change of the angle of the steering shaft. An analog signal is taken off a terminal 5 which corresponds to the angle degree of the steering shaft when a predetermined voltage is added between terminals 6 and 7.

Figure 3:
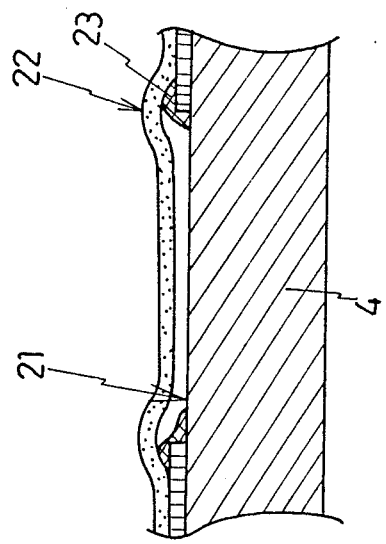
FIG. 3 is an enlarged sectional view of a sliding resistive portion.

As shown in FIG. 3, the resistive element 8 has a double wall construction in which a base resistive element layer 21 is formed on the base plate 4 and a protective resistive element layer 22 is provided. The volume inherent resistance of the protective resistive element layer 22 is set at a range of from 2 to 500 times the volume inherent resistance of the base resistive element layer 21.

The surface of the base resistive element layer 21 is covered by the protective resistive element layer 22 and is not directly exposed to the outside atmosphere, so that the base resistive element layer 21 is cut off and protected from the outside temperature, outside moisture, and dust. Further the sliding member 10 only slides along and contacts the protective resistive element layer 22, so that the base resistive element layer 21 is not subject to any wear. The protective resistive element layer 22 is worn over a period of time by contact of the sliding member 10, however, the protective resistive element layer 22 and the base element layer 21 are in parallel contact with each other and the volume inherent resistance of the protective resistive element layer 22 is set at a range from 2 to 500 times the volume inherent resistance of the base resistive element layer 21, so that the resistance volume of the entire resistive element is not substantially influenced by the wear of the protective resistive element layer 22.

Accordingly, it is unnecessary to provide the conventional rigid and complete airtight construction of a holding case 1 of the main body of the tilt sensor M. Therefore, the present invention permits the tilt sensor to be made thin and of a small size so as to minimize the construction of the season.

In the method of manufacturing the resistive element, a glass epoxy base plate having an electrode copper foil as the base plate 4 is used and a silver paste as an electrode 23 is deposited by screen printing on the base plate 4. The paste is hardened for half an hour at 170° C. Next, a carbon paste (provided by Asahi Chemical Co., Ltd., having a seat resistance of about 350Ω/□) is deposited by screen printing as the base resistive element layer 21 and is hardened in one hour at 170° C. A carbon paste (provided by Asahi Chemical Co., Ltd., having a seat resistance of about 3KΩ/□) is deposited by screen printing and is hardened to provide the protective resistive layer 21. As a result, the base resistive element layer 21 and the protective resistive element layer 22 are formed on the base plate 4.

According to the present invention, airtight construction is not required due to the plural layer construction of the resistive element in the tilt sensor M and continuous measurements can be attained as in the conventional digital type sensor. The above-mentioned effect can be obtained also in an analog type sensor using oxides as the rigid resistive element however, the degree of wear of the resistive element is greater and an output abnormality is generated. Such an output abnormality is not generated in the tilt sensor M of the present invention.

By the foregoing, there has been disclosed a preferred form of tilt sensor in accordance with the present invention. It will be appreciated that various additional, substitutions, modifications and omissions may be made thereto without departing from the spirit of the invention.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A tilt sensor for a vehicle steering shaft comprising:
   a base plate;
   a base resistive element layer provided on a surface of said base plate, said base resistive layer having a volume inherent resistance; and
   a protective resistive element layer of at least one layer formed on said base resistive element layer, said protective resistive element having a volume inherent resistance;
   said base resistive element layer and said protective resistive element layer together defining a plural layer structure in which the volume inherent resistance of the protective resistive layer is higher than the volume inherent resistance of the base resistive element layer.

2. A tilt sensor for a vehicle steering shaft as set forth in claim 1, wherein the volume inherent resistance of said protective resistive element layer is approximately 2 to 500 times higher than the volume inherent resistance of said base resistive element layer.

3. A tilt sensor for a vehicle steering shaft as set forth in claim 1, further including a current collector formed on the base plate.

* * * * *